(12) United States Patent
Oppermann et al.

(10) Patent No.: US 11,402,583 B2
(45) Date of Patent: Aug. 2, 2022

(54) ASSEMBLY COMPRISING A SUBSTRATE AND TWO COMPONENTS INCLUDING OPTICAL WAVEGUIDES, AS WELL AS METHOD FOR PRODUCTION

(71) Applicant: Fraunhofer-Gesellschaft zur Förderung der angewandten Forschung e.V., Munich (DE)

(72) Inventors: Hans-Hermann Oppermann, Berlin (DE); Tolga Tekin, Berlin (DE); Jörg Stockmeyer, Berlin (DE); Juliane Fröhlich, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 188 days.

(21) Appl. No.: 16/947,029

(22) Filed: Jul. 15, 2020

(65) Prior Publication Data

US 2021/0018686 A1 Jan. 21, 2021

(30) Foreign Application Priority Data

Jul. 19, 2019 (DE) .................... 10 2019 210 750.8

(51) Int. Cl.
*G02B 6/26* (2006.01)
*G02B 6/42* (2006.01)

(52) U.S. Cl.
CPC .............. *G02B 6/26* (2013.01); *G02B 6/4224* (2013.01)

(58) Field of Classification Search
None
See application file for complete search history.

(56) References Cited

U.S. PATENT DOCUMENTS

| | | | | |
|---|---|---|---|---|
| 5,414,787 A * | 5/1995 | Kurata | .................... | G02B 6/421 385/88 |
| 5,499,732 A * | 3/1996 | Nishimoto | ............. | G02B 6/423 216/41 |
| 6,728,449 B2 * | 4/2004 | Trott | .................... | G02B 6/4224 385/52 |
| 7,031,575 B2 * | 4/2006 | Blauvelt | ............. | G02B 6/4204 385/39 |
| 8,942,520 B2 * | 1/2015 | Matsuoka | ................ | G02B 6/43 438/24 |
| 10,409,002 B2 * | 9/2019 | Testa | .................. | G02B 6/12002 |
| 11,237,344 B2 * | 2/2022 | Vermeulen | ........... | G02B 6/4214 |

(Continued)

*Primary Examiner* — Jerry Rahll
(74) *Attorney, Agent, or Firm* — Schwegman Lundberg & Woessner, P.A.

(57) ABSTRACT

An assembly may include at least one camera and a controllable mechanical handling device. The system may further include a first component, including a first optical waveguide and a second component, including a second optical waveguide. The first component and the second component are fixedly connected to a substrate and arranged directly next to one another on the substrate and relative to one another in such a way that a coupling side of the first component and a coupling side of the second component are situated opposite each other on a first and second side of a coupling plane. The optical waveguides of the first and second component each end at a first coupling surface or a second coupling surface. The first and second coupling sides are aligned, and optically coupled with one another at a first and second end face.

17 Claims, 7 Drawing Sheets

(56) References Cited

U.S. PATENT DOCUMENTS

2003/0152328 A1\* 8/2003 Trott .................... G02B 6/4224
385/52
2021/0018679 A1\* 1/2021 Manier ................ G02B 6/4224
2021/0018686 A1\* 1/2021 Oppermann ......... G02B 6/4224

\* cited by examiner

ASSEMBLY COMPRISING A SUBSTRATE AND TWO COMPONENTS INCLUDING OPTICAL WAVEGUIDES, AS WELL AS METHOD FOR PRODUCTION

PRIORITY APPLICATIONS

This application claims the benefit of priority of German Application No. 10 2019 210 750.8, filed on Jul. 19, 2019, which is hereby incorporated herein by reference in its entirety.

The invention concerns the field of semiconductor technology and micromechanics as well as optics and can be used particularly advantageously in the field of the hybrid integration of microelectronics and photonics.

BACKGROUND

In addition to the integration of electronic components into semiconductor components, the integration of optical and optoelectronic components and the miniaturization thereof also continue to progress. Typical optoelectronic components include laser sources, modulators, photodiodes and the like. These are often combined in optically integrated circuits comprising splitters, couplers, phase shifters, delay lines, ring resonators, optical amplifiers, switches or other elements, wherein the light is usually guided through optical waveguides within the components. The waveguides can be implemented between the components as separate optical fibers or as integrated waveguides in corresponding substrates. If only individual light modes are to be transported, what are known as single-mode waveguides are needed, some of which have diameters of several hundred nanometers to a few micrometers.

If light is to be transmitted from one optical waveguide into a second optical waveguide, that is, two lights guides are to be coupled to one another, the requirements with regard to the positioning accuracy are particularly high. A particularly challenging implementation of a coupling is the arrangement of second optical waveguides at the end faces, in which these are oriented along a shared axis and arranged at end faces with respect to one another. This problem arises, for example, when coupling optical waveguides that are integrated into two different components, wherein the components are to be aligned with respect to one another in such a way that the optical waveguides of the different components are coupled to one another at the end faces.

It is possible, in principle, to adjust such components with respect to one another, while light from one optical waveguide of a first component is being coupled into an optical waveguide of the second component, so as to optimize the coupling, and thus the adjustment, as a result of the measurement of the transmitted light. This method, however, is very complex and very expensive to use in mass production.

It has also been described to utilize a self-adjustment of the components using liquid solder during mounting. The surface tension of the liquid solder is used in the process to pull the component into an optimized position. In addition, mechanical stops can be provided so as to define the particular target position.

SUMMARY/OVERVIEW

Against the background of the related art, it is the object of the present invention to create an assembly of components including optical waveguides on a substrate, which allows the optical waveguides of different components to be easily and reliably positioned relative to one another in a target position.

The object is achieved according to the invention by an assembly having the features of claim 1. Claims 2 to 6 represent possible implementations of the invention. The invention further relates to a substrate for mounting as well as to a method for mounting an assembly comprising two components including optical waveguides on a substrate.

Accordingly, the invention relates to an assembly comprising a mounting device, which includes at least one camera as well as a controllable mechanical handling device, and comprising at least one first component and one second component, which are each fixedly connected to a shared, planar substrate and which each comprise at least one optical waveguide, wherein the components are arranged directly next to one another on the substrate and relative to one another in such a way that two coupling sides of the components are situated opposite one another on the two sides of a coupling plane, and that at least two optical waveguides of the different components which each end at coupling surfaces at the coupling sides are oriented so as to be in alignment with one another and are positioned so as to be optically coupled to one another at the end faces.

The coupling plane may also be identical to one coupling side or the two coupling sides of the components, or to a plane extending through the end-face coupling sites of the optical waveguides at a coupling side of a component.

The object is achieved according to the invention by the substrate, at the surface thereof facing the components, including a first optically detectable substrate marking set and a second optically detectable substrate marking set, by each substrate marking set including at least one straight line, and in particular at least two straight lines that are parallel to and spaced apart from one another, wherein the lines or the straight extensions thereof in each case pass through the coupling plane, and by the first component bearing a first component marking set, and the second component bearing a second component marking set, wherein the component marking sets each include straight, optically detectable lines or markings that extend parallel to the longitudinal axes of the optical waveguides to be coupled, and by the mounting device being configured to assemble the components and the substrate in such a way that the components, based on the component marking sets, are exclusively optically aligned with the lines of the substrate marking sets.

Markings can also be formed, for example, by two or more optically detectable dots or groups of dots located on a straight line, for example in the form of discontinuous lines.

The components are typically such components in which optical elements are included, and in particular optical elements are integrated. In addition, electronic elements may be integrated into the components. At the coupling sides, the components comprise respective coupling surfaces at which the optical waveguides to be coupled to one another end. So as to form a preferably optically well-defined exit surface at a coupling side or edge of a component for an optical waveguide, the component and/or the waveguide can either be broken along an easy-to-split crystal orientation with a clean surface, a dry etching process can be used to create a lithographically structured mask, or a preferably well-defined coupling surface can be created by polishing the coupling side of the component. In all cases, tolerances arise during the formation of the exit surface at the component. So as to couple the components to one another and set as small a distance as possible between the exit surfaces of the optical waveguides to be coupled, the components have to be linearly pushed toward one another in many instances for achieving an optimized position. It is therefore recommended that the substrate marking sets include straight, mutually parallel lines along which the components can be pushed toward one another. In this way, an optimized distance can be set between the coupling sides of the components, regardless of how much was removed from the components to be connected/coupled to one another during the formation of the exit surface. So as to optimize the angular orientation of the two components with respect to one another, it is advantageous to provide several mutually spaced parallel lines in each of the substrate marking sets and component marking sets. However, a single line in a marking set may also be sufficient. It may be provided in this regard, for example, that this line extends across the entire component.

In the mounted state, the coupling surfaces of the components are situated opposite one another on the two sides of a coupling plane. The distance between the coupling surfaces and the coupling plane can be selected to be arbitrarily small, so that the two coupling surfaces are also located in the coupling plane when at the limit and can touch one another.

The individual lines of the marking sets are optically detectable, and can also be rendered detectable by optical detection systems of automatic pick-and-place machines. The lines of the marking sets can be applied to the substrate and the components using etching methods, for example. For this purpose, it is also possible, for example, to use the mask that is used for forming the optical waveguides at the components.

The optical waveguide itself, or an edge of a trench or of a bridge in which an optical waveguide is arranged, for example, may also serve as a line of a marking set on a component. In principle, it may be attempted to create a strip as narrow as possible by etching or applying a marking substance during the creation of a line of a marking set. However, it is also conceivable to mark a visible surface on a component or the substrate, wherein at least one edge of this surface extends in an exactly defined and straight manner and forms a line of a marking set. In principle, lines of marking sets can be formed by borders of bridges or trenches or straight edges, which are produced on the components or the substrate within the scope of micromechanical semiconductor processing, that is, in particular by etching.

The shape, position and orientation of the substrate marking set can be recorded and stored by way of the camera. Thereafter, the components can be gripped and positioned by way of the handling device in such a way that the component marking sets are aligned, or line up, with the substrate marking sets. For this purpose, the previously recorded image of the substrate marking sets, serving as a stored image, can even be compared to the images of the component marking sets when the components already hide the surface of the substrate. The image comparison is carried out by a processing and control unit.

One possible embodiment of the invention can provide that the optical waveguides to be coupled in the two components, after having been mounted onto the substrate, extend at the same distance from the substrate surface, wherein the optical waveguides are, in particular, each arranged at the side of the components facing the substrate, at the surface thereof. For this purpose, it may be provided, for example, that the optical waveguides run on a surface of the first and second components, wherein the two components have the same thickness. As an alternative, a height difference has to be compensated for by suitable platforms in the substrate if the optical waveguides are differently positioned in the various components.

A further embodiment can provide that the components are connected to the substrate using flip chip technology. Flip chip technology or flip chip assembly is understood to mean a packaging method for contacting components in which the components are mounted directly, and without the use of bonding wires, with one contacting side oriented toward the substrate. Contact surfaces of the component are then pressed directly onto bumps of the substrate, and thereby brought in electrical contact with the substrate. It is also possible for solder quantities that are printed or applied by way of other methods to be provided on the substrate as bumps, which can be at least partially liquefied for final contacting.

The optical waveguides to be coupled can each be arranged at the components on the side situated opposite the contact side. In the case of flip chip assembly, the optical waveguides to be coupled are then situated easily accessibly on the upper side of the components. This is also the side on which the component marking sets are provided. The optical waveguides, however, can also be located on the contact side of the components which faces the substrate, and there in particular at the surface of the components.

A further implementation of the assembly can provide that at least one of the substrate marking sets includes a line that extends parallel to the coupling plane. In principle, the components can be freely displaced to a certain degree along the lines of the substrate marking sets that pass through the coupling plane. A line of a substrate marking set that extends parallel to the coupling plane can be used to position at least one of the components relative to the coupling plane. For example, a front edge at the coupling side of the components can be aligned with the line of the substrate marking set which extends parallel to the coupling plane. Thereafter, the second component can either be oriented based on a further line of a substrate marking set which extends parallel to the coupling plane, or based on the coupling side of the first component.

Moreover, it may be provided, for example, that one or more of the lines of the marking sets are lines or edges of optically detectable surfaces.

Moreover, it may be provided that one or more of the lines, or all lines, of the substrate marking sets and/or of the component marking sets which, or the extensions of which, pass through the coupling plane are oriented at an angle of less than 90 degrees with respect to the coupling plane, and extend parallel to the longitudinal axes of the optical waveguides of the components to be coupled in the region of the coupling surfaces.

At the coupling sides of the components, the optical waveguides are frequently not guided perpendicularly to the particular coupling surface of the component at the coupling side, but at an angle deviating from the perpendicular, so as to avoid or to minimize back reflections at the exit surfaces of the optical waveguides. In this case, it is useful, for establishing the optimal distance, to displace the components relative to one another along the longitudinal axes of the optical waveguides to be coupled to one another so as to avoid a lateral offset. For this reason, the lines of the substrate marking sets and of the component marking sets which pass through the coupling plane, or the extensions of which pass through the coupling plane, are in each case oriented parallel to the optical waveguides to be coupled, and in the described cases do not extend perpendicularly to the coupling surface/coupling side of the components, but at an angle different from 90 degrees with respect to the coupling surface coupling side.

In addition to an assembly of the type described and explained above, the invention also relates to a substrate for mounting at least one first component and one second component, which are each fixedly connected to the substrate by way of the flip chip technology, wherein two coupling sides of the components are situated opposite one another in a coupling plane, or on both sides of a shared coupling plane, and wherein at least two optical waveguides of the different components which end at the coupling sides in coupling surfaces are oriented so as to be in alignment with one another and are positioned so as to be optically coupled to one another at the end faces. The object is then achieved according to the invention by the substrate, at the surface thereof facing the components, including a first optically detectable substrate marking set as well as a second optically detectable substrate marking set for positioning the components.

The invention further relates to a method for mounting an assembly comprising at least one first component and one second component, which are each fixedly connected to a shared, planar substrate and which each comprise at least one optical waveguide, wherein the components are arranged directly next to one another on the substrate and relative to one another in such a way that two coupling sides or coupling surfaces of the components are situated opposite one another in one coupling plane or on both sides of a shared coupling plane, and that at least two optical waveguides of the different components which each end at the coupling sides are oriented so as to be in alignment with one another and positioned so as to be optically coupled to one another at the end faces, wherein the first component bears a first component marking set, and the second component bears a second component marking set, each including at least one straight line, and in particular at least two straight lines that are parallel to and spaced apart from one another, which extend parallel to the longitudinal axes of the optical waveguides to be coupled, wherein the substrate, at the surface thereof facing the components, includes a first optically detectable substrate marking set as well as a second optically detectable substrate marking set, wherein over the course of the method first the first component, with the lines of the component marking set thereof, is aligned with the lines of the first substrate marking set and connected to the substrate, and thereafter the second component, with the lines of the component marking set thereof, is aligned with the lines of the second substrate marking set, and in particular is connected to the substrate at the smallest possible distance from the first component.

Instead of aligning the second component marking set with the second substrate marking set, alternatively it may also be provided that the second component marking set is aligned with the first component marking set of the component already connected to the substrate.

The alignment of the components based on the substrate marking sets and the component marking sets can be carried out, for example, by an automatic, camera-based detection and pick-and-place system. The alignment takes place in such a way that the lines of different marking sets, as viewed from the top side of the components, are made to line up with one another, or are aligned, in such a way that a line of a substrate marking set forms a straight extension of a line of a component marking set arranged above it.

In the method it may also be provided, for example, that the two components are attached to the substrate by way of bump contacts. The bump contacts can be produced so uniformly that each of them has the same, defined height with respect to the substrate, so that a planar contact surface of a component can be oriented on the bump contacts parallel to the surface of the substrate. The bump contacts can be implemented in such a way that, as a result of pressure, in particular in conjunction with other physical or chemical forms of action, a respective conducting connection can be established between contact surfaces of the components and the substrate and, at the same time, the components can be mechanically fixedly connected to the substrate.

Moreover, it may be provided, for example, that the components are placed onto non-deformable mechanical stoppers, which are connected to the substrate, during an attachment to bump contacts of the substrate or during an attachment to the substrate by way of a soldering process. The mechanical stoppers can be designed to be electrically conducting or non-conducting and, for example, be exclusively used to define the position of a component on the substrate. In this way, they exclusively form mechanical stops, and the electrical contacting is established via separate marking points or contact bumps. In this case, the electrical contacting can also be formed by way of soldering points, which per se, when liquefied, do not allow sufficiently precisely defined positioning of the contacted component relative to the substrate; however, as a result of the mechanical stoppers, if necessary in conjunction with pressure that is exerted on the component during the soldering process, the component can be connected to the substrate by way of soldering and, at the same time, sufficiently precise positioning of the component above the substrate can be achieved.

BRIEF DESCRIPTION OF THE FIGURES

The invention is shown and described hereafter based on exemplary embodiments in figures of a drawing. In the drawings.

DETAILED DESCRIPTION

Figure 1:
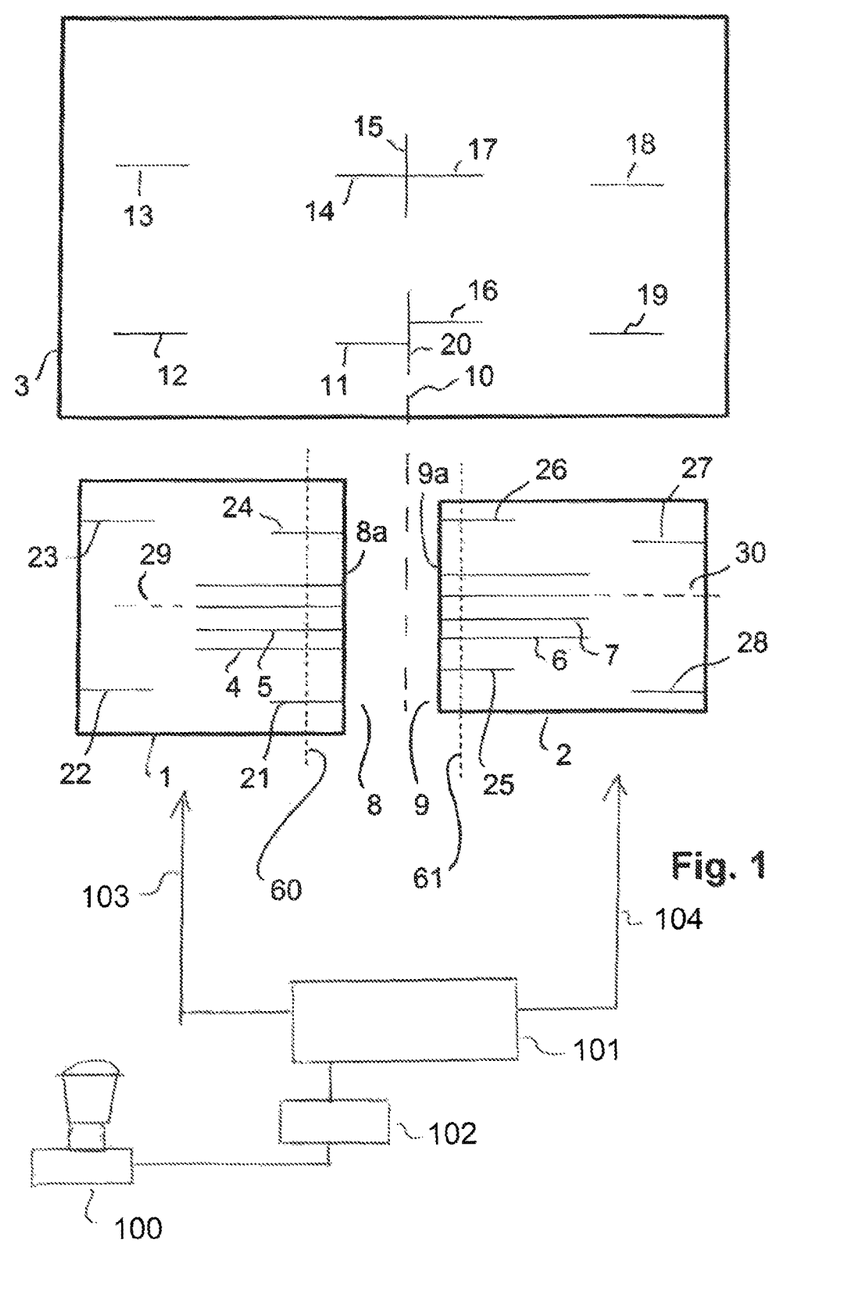
FIG. 1 shows a view of a substrate and two components prior to mounting.

FIG. 1 shows a substrate 3 as well as a first component 1 and a second component 2 prior to being mounted on the substrate. The substrate 3 includes a first substrate marking set 11, 12, 13, 14, 15 and a second substrate marking set 16, 17, 18, 19, 20. The two components 1, 2 are to be coupled with the coupling sides 8, 9 thereof, or more specifically with the coupling surfaces 8a, 9a, along the coupling plane 10 and mounted on the substrate 3. This is to ensure that light can be coupled between the optical waveguides 4, 5 on the first component and the optical waveguides 6, 7 on the second component 2 with high efficiency.

The first component bears a first component marking set 21, 22, 23, 24, wherein the individual lines of the component marking set in each case extend parallel to the longitudinal axis 29, 30 of the optical waveguides on the components 1, 2 and, in the mounted state, perpendicularly to the coupling plane 10. The second component 2 bears a second component marking set 25, 26, 27, 28.

The optical waveguides 4, 5, 6, 7 on the components are shown schematically. They can each be connected on the components to optical elements, such as laser diodes, photodiodes or other optically active elements, which are not illustrated here for the sake of clarity.

Additionally, two dashed lines 60, 61 are plotted in FIG. 1, which indicate that the components 1, 2 for coupling, and prior to being mounted on the substrate 3, can be ground/polished at the coupling sides thereof up to these lines, can be dry-etched, or can be broken/cut at these lines, so as to create a smooth coupling surface in each case, which allows favorable and loss-free coupling of the optical waveguides. This processing of the components 1, 2 can take place after the component markings have been applied. The lines 21, 24, 25, 26 of the component marking sets are at least partially preserved during the post-processing of the components. In this way, the component markings can be lined up with the corresponding substrate markings, despite a modification of the components.

In addition to the substrate and the components, FIG. 1 shows a camera 100, which can also be replaced with a system composed of multiple cameras, as well as a handling device 101, which can be configured as an automatic pick-and-place machine, and an image processing and control unit. The handling device comprises gripper arms 103, 104 for gripping the components.

Figure 2:
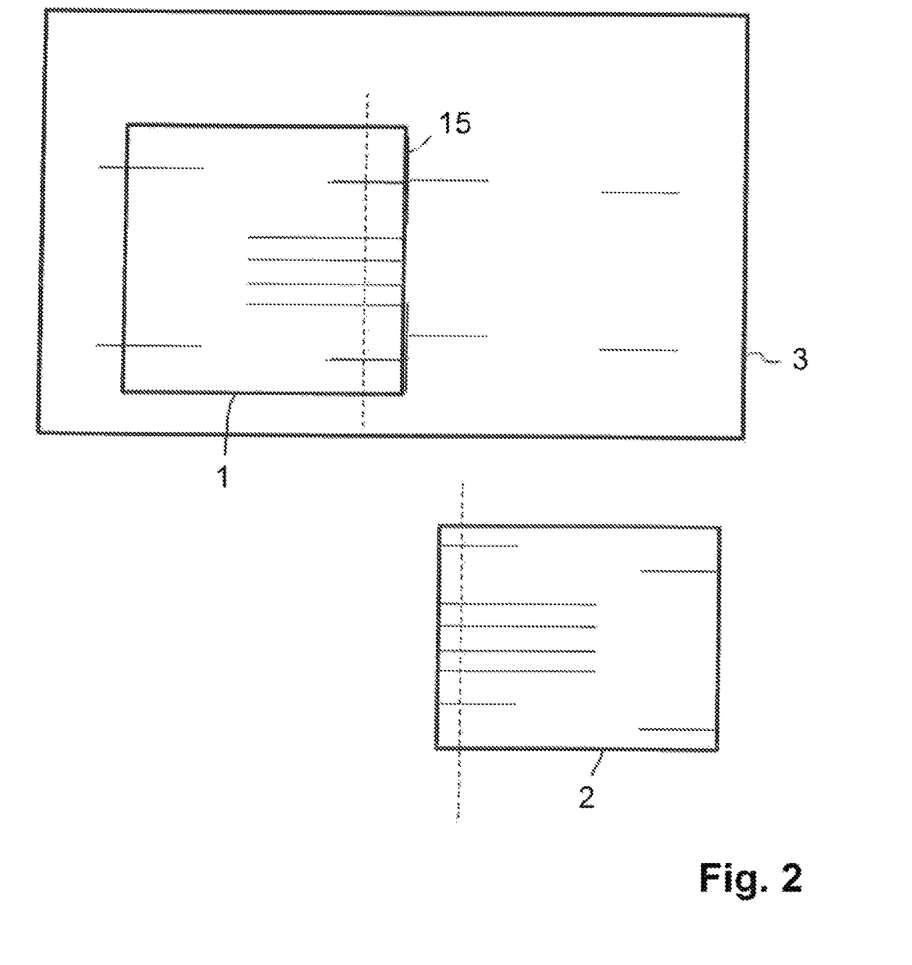
FIG. 2 shows a substrate comprising a first mounted component as well as a second component prior to mounting.

FIG. 2 shows the substrate 3 from FIG. 1, the first component 1 having been placed and mounted on the substrate. The first component 1, with the lines 21, 22, 23, 24 of the first component marking set thereof, is aligned in each case with the lines 11, 12, 13, 14 of the first substrate marking set in such a way that line 21 is made to line up with line 11, line 22 with line 12, line 23 with line 13, and line 24 with line 14. The coupling surface 8a of the first component 1 is made to line up with line 15 of the first substrate marking set, which extends parallel to the coupling plane 10 and, in particular, is situated in the coupling plane 10. For the sake of clarity, the designations of the individual lines of the marking sets have been omitted in FIGS. 2 and 3 since the lines of the different marking sets are arranged on top of one another and are therefore not distinguishable.

Figure 3:
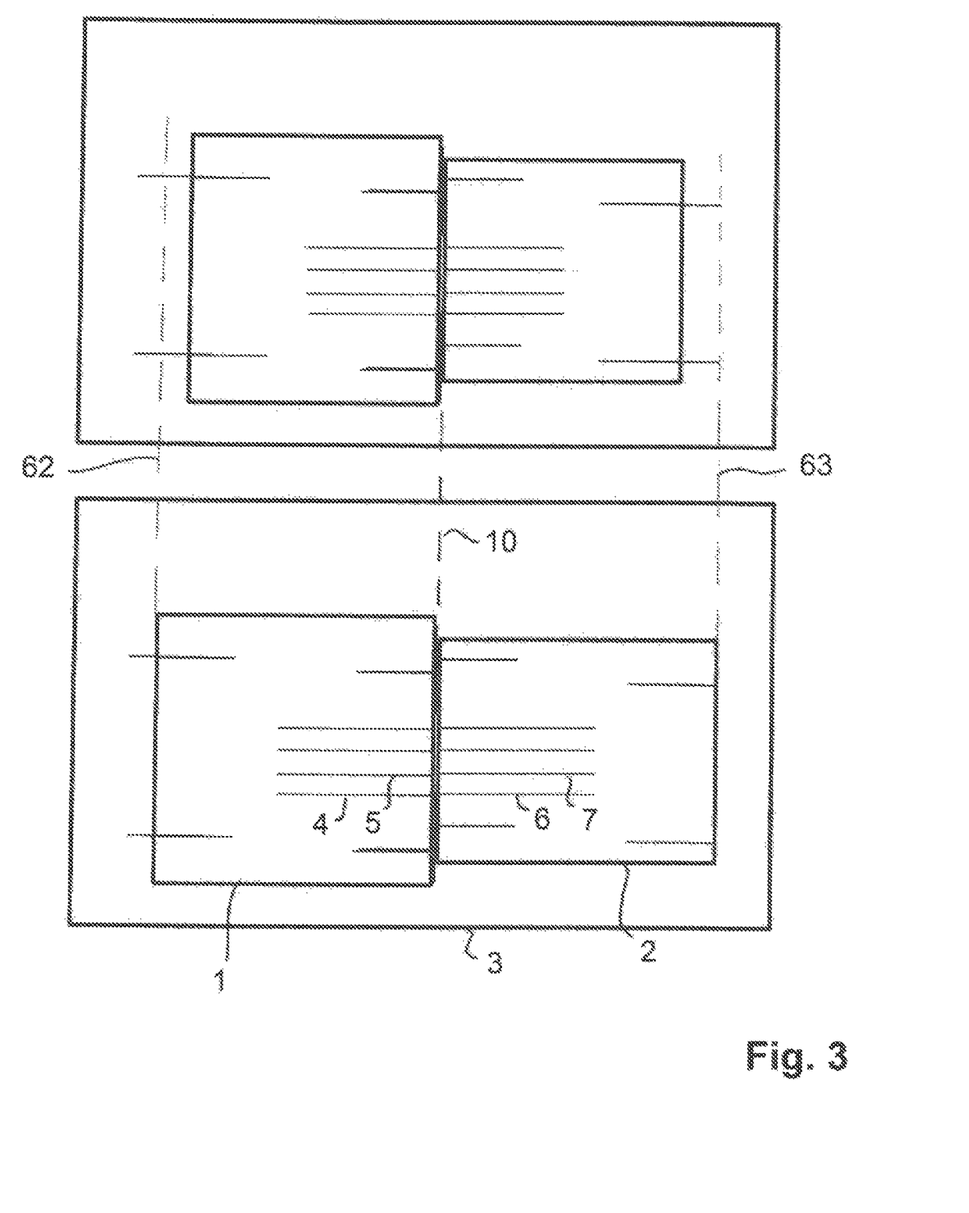
FIG. 3 in the lower portion shows a substrate comprising two mounted components, and in the upper portion shows a substrate comprising two mounted, shortened components.

The lower portion of FIG. 3 shows a substrate 3 comprising two mounted components 1, 2, wherein the component marking sets have been made to line up with the respective substrate marking sets. The optical waveguides 4, 5, 6, 7 are each oriented coaxially with respect to one another in pairs and are coupled edge-to-edge at the end faces.

The upper portion of the representation of FIG. 3 shows a mounting of a first component 1 and of a second component 2 after post-processing, including corresponding shortening of the components. The shortening of the components 1, 2 is apparent in that these take up less space on the substrate 3 after the coupling surfaces have been arranged along the coupling plane 10. For comparison, dashed lines 62, 63 are plotted in FIG. 3, which represent the ends of the components 1, 2 in the unchanged, unprocessed form after mounting (example in the lower portion of FIG. 3). After processing/shortening, the processed components are simply pushed along the lines of the marking sets toward the coupling plane 10.

Figure 4:
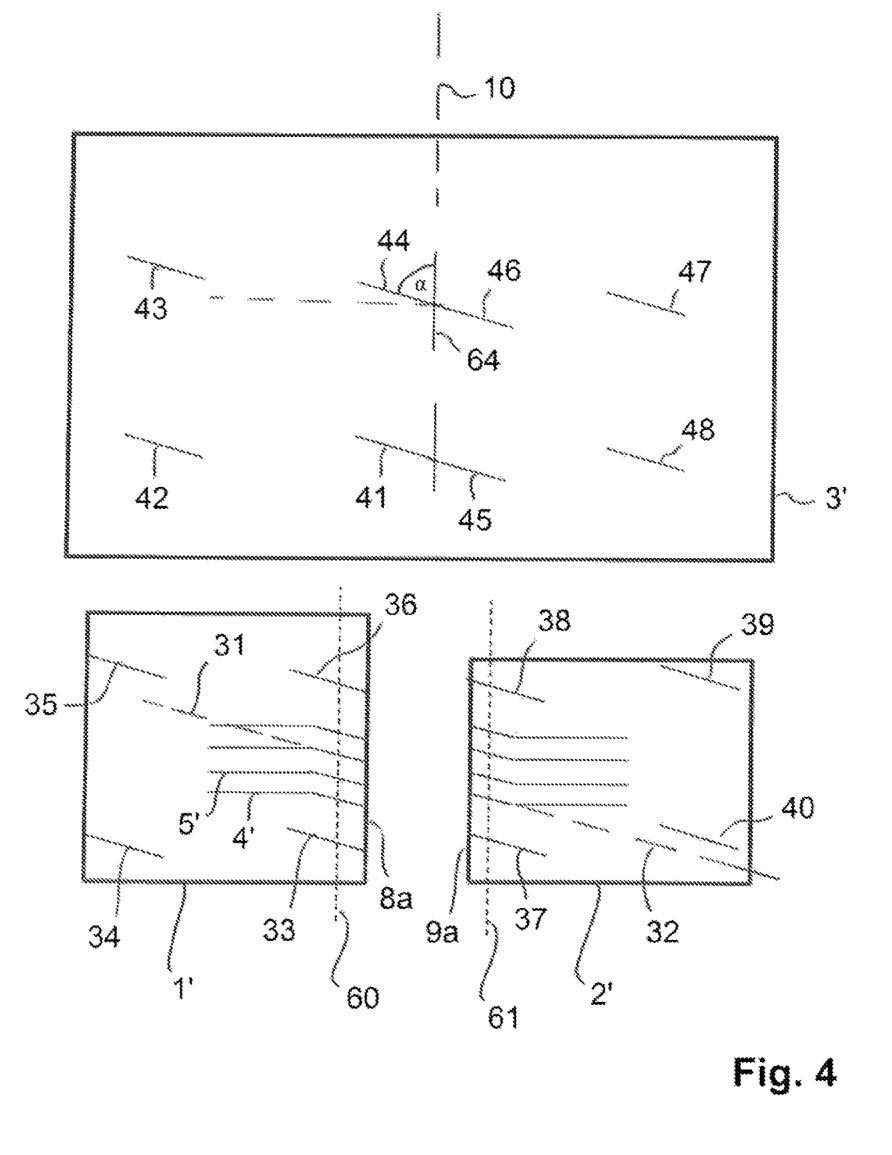
FIG. 4 shows a substrate with two components prior to mounting, wherein the components include obliquely extending optical waveguides at the coupling sides.

The upper portion of FIG. 4 shows a substrate 3' including two substrate marking sets 41, 42, 43, 44, 45, 46, 47, 48, 64, which extend at an angle α that is smaller than 90 degrees with respect to the coupling plane 10. The angle α corresponds to the angle that the ends of the optical waveguides 4', 5' on the components 1', 2' include with the coupling plane 10 or with the coupling surface 8a of the individual components.

At the coupling side, in the vicinity of the coupling surface of the respective component 1', 2', the optical waveguides 4', 5' are not arranged so as to extend perpendicularly to the coupling surface, but are arranged slightly obliquely so as to prevent back reflections at the coupling surface. The longitudinal axes of the optical waveguides in the coupling region are denoted by reference numerals 31 and 32 in the case of the components 1' and 2'.

The individual lines 33, 34, 35, 36, 37, 38, 39, 40 of the component marking sets are oriented parallel to the longitudinal axes 31, 32 of the optical waveguide ends in the coupling region, that is in the vicinity of the coupling surfaces 8a, 9a, and include the same angle α with the coupling plane 10 as the corresponding lines of the substrate marking sets.

Dashed lines 60, 61 are plotted in FIG. 4, which indicate the course of the coupling surfaces 8a, 9a after the components 1', 2' have been processed and a portion of the components 1', 2' has been removed by polishing or cutting. Such processing of the components 1', 2' is not necessary in all cases, but may be useful. This processing of the components 1', 2' takes place after the component marking sets have been applied.

Figure 5:
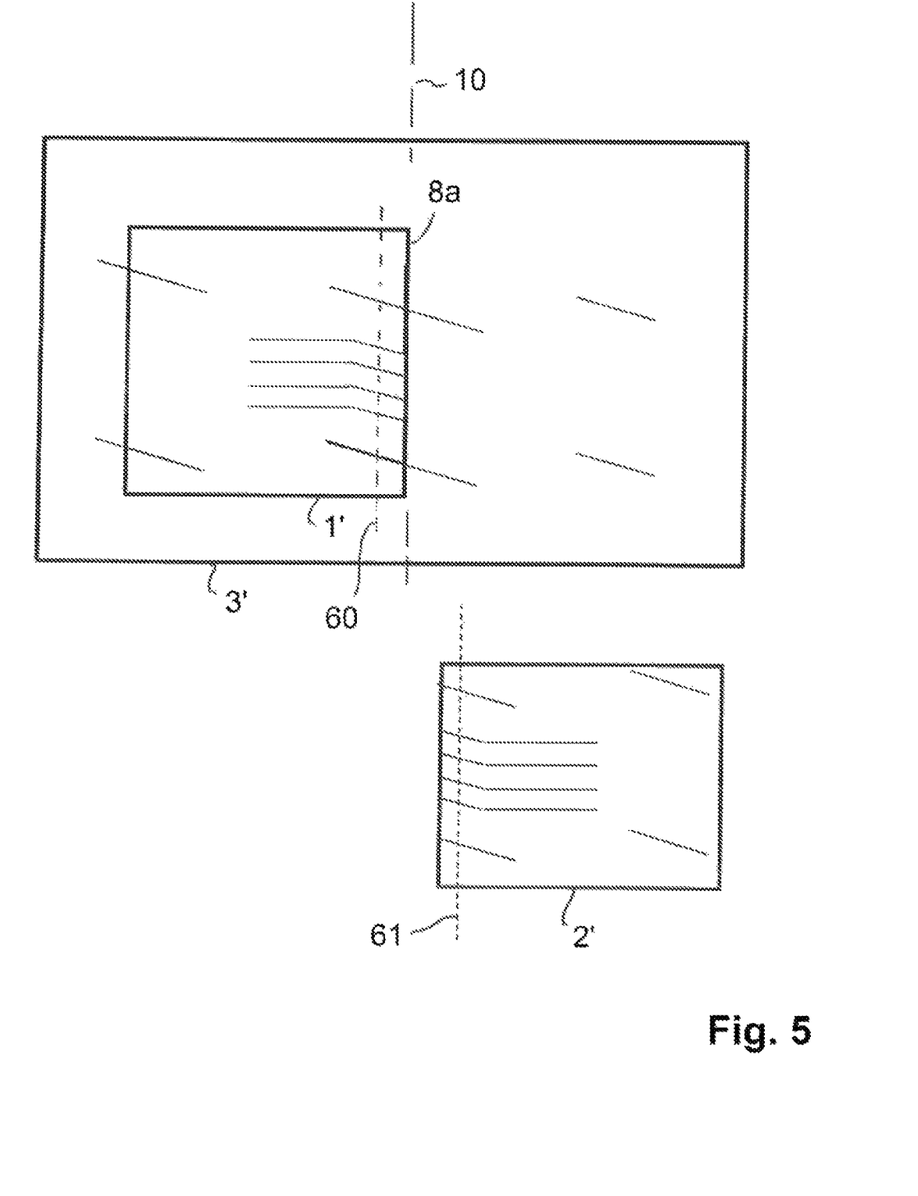
FIG. 5 shows the substrate from FIG. 4 comprising a first mounted component and a second component prior to mounting.

FIG. 5 shows the substrate 3' from FIG. 4, comprising a component 1' mounted thereon. The component marking set of the first component 1' is lined up with the substrate marking set on the substrate 3'. The coupling surface 8a of the first component 1' is aligned with the marking/line 64 of the substrate marking set, so that the coupling surface 8a is situated in the coupling plane 10.

Figure 6:
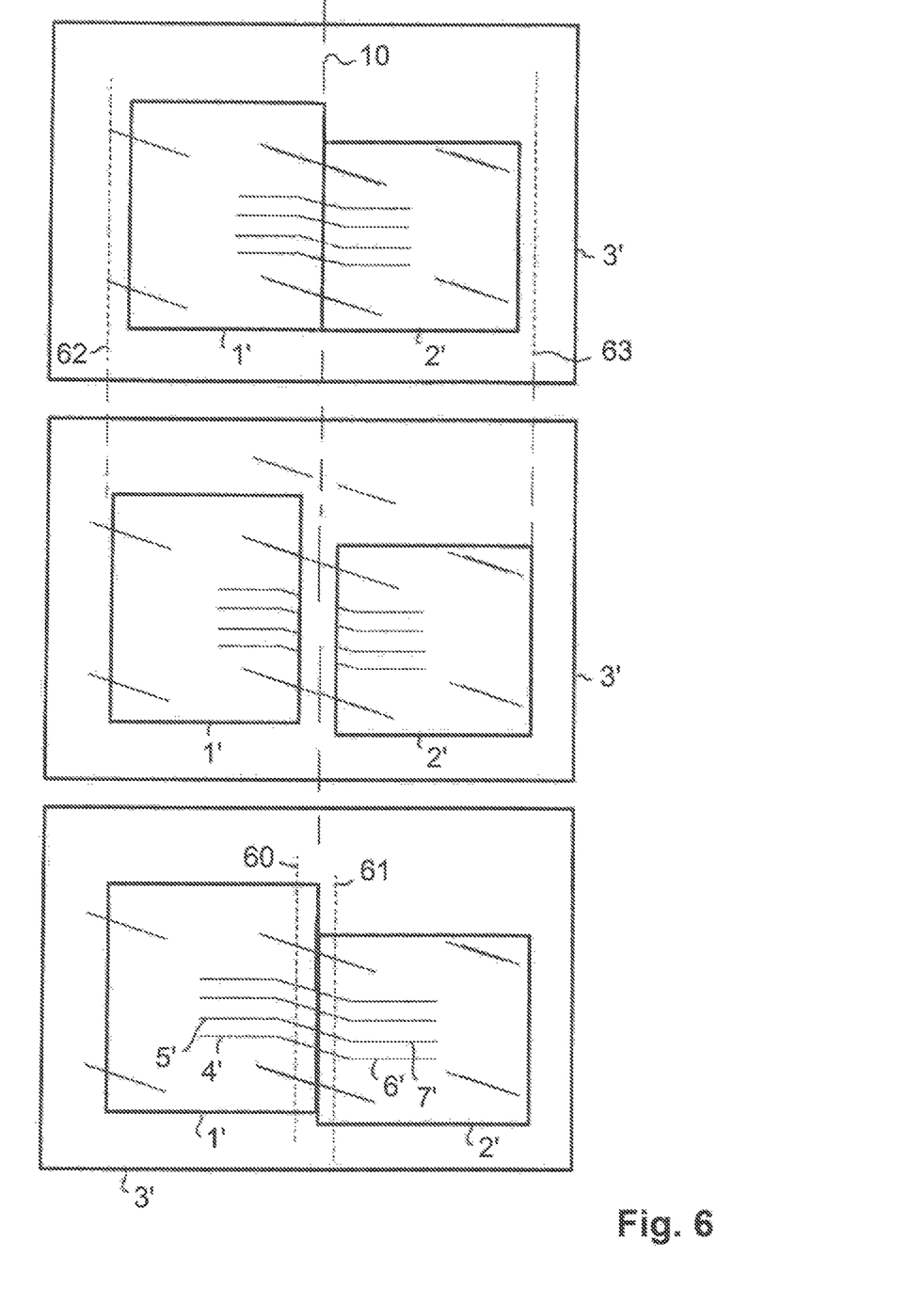
FIG. 6 at the bottom shows the substrate from FIG. 4 comprising two mounted components, in the center shows the substrate with two shortened components prior to mounting, and at the top shows the substrate comprising two shortened components after mounting.

The lower portion of FIG. 6 shows the substrate 3' from FIG. 5, wherein the second component 2' has also been mounted and coupled to the component 1' in such a way that the optical waveguides 4', 5' are coupled to the optical waveguides 6', 7' on the second component 2' edge-to-edge at the end faces.

The component marking sets of the two components 1', 2' are made to line up with the substrate marking sets of the substrate 3'. The lines 60, 61, which show potential coupling surfaces of the components 1', 2' after polishing or cutting, are not relevant for the lower portion of the figure.

If the components 1', 2' are post-processed by polishing or cutting in the region of the coupling surfaces, the new coupling surfaces result after processing along the lines 60, 61, and the components 1', 2' are slightly shortened. This is evident after the components 1', 2' have been placed onto the substrate 3' in the center portion of FIG. 6. After shortening, the two components 1', 2' are not directly seated edge-to-edge yet with the coupling surfaces thereof, but should be pushed toward one another up to the coupling plane 10 for optimized coupling before they are mounted on the substrate 3'. This pushing of the individual components 1', 2' takes place along the oblique lines 41, 42, 43, 44, 45, 46, 47, 48 of the substrate marking sets, so that the component marking sets can remain lined up with the substrate marking sets during the displacement process of the components. The oblique ends of the optical waveguides 4', 5', 6', 7' remain oriented parallel to one another during the displacement until an edge-to-edge coupling or an arrangement of the optical waveguides to be coupled at the end faces with the minimally possible distance has been achieved. As a result of the oblique positioning of the lines of the marking sets, it is achieved that the marking sets do not have to be changed when the components 1', 2' are shortened in the region of the coupling surfaces by polishing or cutting. This is independent of the thickness of the removed layer of the components 1', 2' as long as the new coupling surface is situated in the region in which the optical waveguides 4', 5', 6', 7' are obliquely positioned at the same angle with respect to the coupling plane 10.

The upper region of FIG. 6 shows the components 1', 2' in the final mounted state on the substrate 3'. The dashed lines 62, 63 indicate the extent to which the components have been shortened.

In principle, it is possible, instead of individual lines, to also use line pairs composed of parallel lines situated closely together, both in the case of the marking sets including oblique marking lines, as shown in FIGS. 4, 5 and 6, and in the case of the marking sets in which the lines extend perpendicularly to the coupling plane. For example, the lines of the substrate marking sets can each be designed as double lines, so that individual lines of the component marking sets can each be positioned between two lines of a marking of a substrate marking set. Conversely, it is also possible to provide each of the component marking sets with double lines, so that the respective lines of a component marking set which are situated closely together and extend parallel to one another can be positioned in such a way with respect to the substrate that an individual line of a substrate marking set ends up between the respective lines of a double line of a component marking set which are situated closely together. The distance between the respective lines of a double line which are situated closely together should be less than four times, and in particular less than two times, the width of a line.

Figure 7:
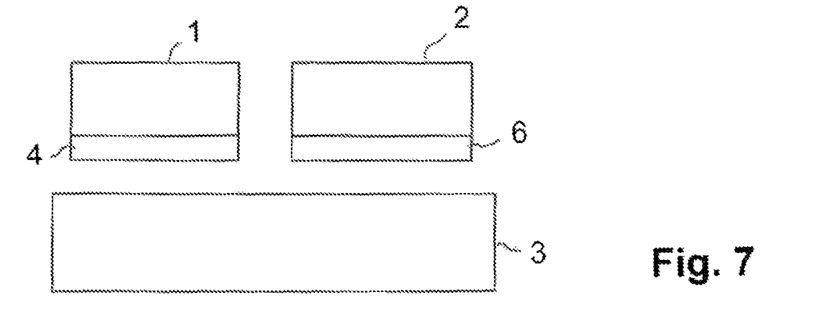
FIG. 7 shows a side view of a substrate with two components prior to mounting.

FIG. 7 shows a substrate 3 together with two components 1, 2 prior to mounting. It is apparent that the optical waveguides 4, 6, which are integrated into the components 1, 2, are located on the underside thereof (contact side), that is, on the side of the components facing the substrate 3. If the two components 1, 2 can be mounted at the same height relative to the substrate 3, the optical waveguides 4, 6 are thus positioned at the same height, regardless of the thickness of the components 1, 2. Experience has shown that the thickness of the components 1, 2 fluctuates, so that either less efficient coupling would take place, or additional adjustment would become necessary, if the optical waveguides 4, 6 were positioned on the upper side of the components, that is, on the side facing away from the substrate 3.

Figure 8:
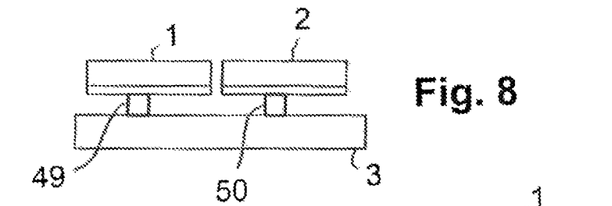
FIG. 8 shows a substrate comprising two components, which rest on bump contacts.

A mounting problem then involves attaching the components 1, 2 at the same height on the substrate 3. FIG. 8 shows that the components 1, 2 can be mounted on what are known as bump contacts 49, 50. Connecting surfaces of the components 1, 2 are connected to the bump contacts 49, 50 in a contacting and mechanically fixed manner, for example by exerting sufficient pressure. In this way, an attachment of the components 1, 2 at the same height can be ensured solely by setting the height of the bump contacts 49, 50 with sufficient precision when the waveguide planes in both components are arranged equally deep below the surface.

Figure 9:
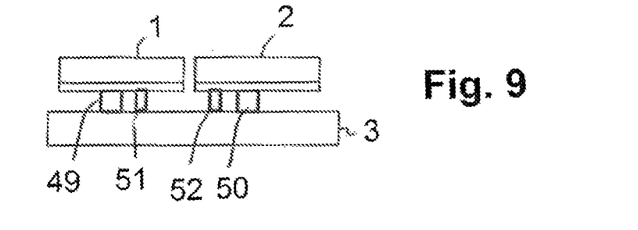
FIG. 9 shows a substrate comprising two components on bump contacts, including additional mechanical stoppers.

In addition to FIG. 8, FIG. 9 shows mechanical stoppers 51, 52 in the mounted state. These can be produced from the material of the substrate 3, for example, which can be made of silicon or another semiconductor material, for example. The mechanical stoppers 51, 52 can be produced together with the substrate in an integrated production process, or can also be applied later as separate components, for example by gluing. As a result, setting the height of the components 1, 2 above the substrate becomes independent of controlling the deformation of the bump contacts 49, 50.

Figure 10:
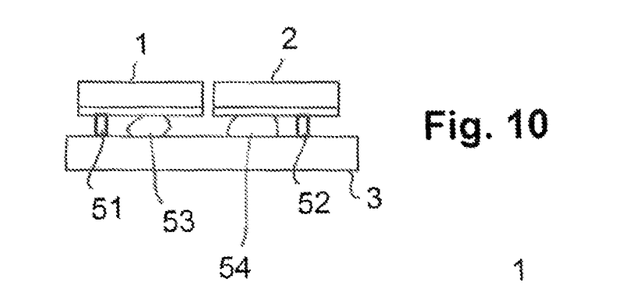
FIG. 10 shows a substrate comprising two components, including soldered connections and mechanical stoppers.

FIG. 10 shows that the distance between the components 1, 2 and the substrate can also be maintained well within the scope of a pure soldering process. FIG. 10 shows the soldering points 53, 54 as contact elements, which can establish both an electrical contact between the components 1, 2 and the substrate 3, and a mechanical connection. A fixed mechanical stop is additionally provided by the mechanical stoppers 51, 52, which are fixedly connected to the substrate 3 and made, for example, of the same material as the substrate 3. The mechanical stoppers 51, 52 can be produced in one piece with the substrate 3.

Figure 11:
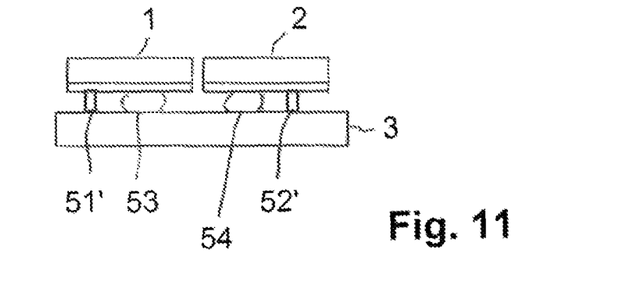
FIG. 11 shows a substrate comprising two components and mechanical stoppers of a further design, including a soldered connection between the components and the substrate.

FIG. 11 shows that, when a soldered connection is used between the components 1, 2 and the substrate 3, it is possible to use mechanical stoppers 51', 52' that are produced separately from the substrate 3 and can, for example, be adhesively bonded to the substrate. These separate mechanical stoppers can, for example, also be galvanically applied in an additive process and be made of copper, nickel or gold, or another metal. The electrical connection between the components and the substrate can take place by thermal soldering, reflow soldering, or fusing or remelting deposited solder.

The bonded joint between the bump contacts and the components 1, 2 can be established by gold-gold thermocompression bonding. The tolerance of the heights of the bump contacts can be kept very small, for example below 5 percent. This can be further improved by planarization and be minimized to a range of approximately 100 nanometers.

Even lower tolerances can be achieved when the bump contact surfaces are planarized and chemically activated, since mounting is then possible with low bonding temperatures and low bonding forces, wherein the deformation of the bump contacts and the height tolerance after mounting are further minimized.

Overall, this yields an optimized accuracy of the positioning of light waves of the different components with respect to one another in the direction perpendicular to the substrate, and in the direction parallel to the substrate surface, and thus optimized optical edge-to-edge coupling.

The project that resulted in this application was funded by the Horizon 2020 Research and Innovation program of the European Union according to grant agreement no. 761989.

The invention claimed is:

1. An assembly, comprising:
a mounting device, the mounting device including:
   at least one camera;
   a controllable mechanical handling device:
   a first component and a second component, wherein the first component and the second component are each fixedly connected to a shared planar substrate, wherein the first component includes an optical waveguide and the second component includes an optical waveguide, wherein the first component and the second component are arranged directly next to one another on the substrate and relative to one another in such a way that a coupling side of the first component and a coupling side of the second component are situated opposite each other on a first coupling side and a second coupling side of a coupling plane, and wherein the optical waveguide of the of the first component and the optical waveguide of the second component each end at, at least one of, a first coupling surface or a second coupling surface, and the first coupling side and the second coupling side are oriented to be in alignment with one another and positioned to be optically coupled to one another at a first end face and a second end face, wherein:
   the substrate includes a first optically detectable substrate marking set and a second optically detectable substrate marking set at a surface of the substrate facing the first component and the second component, wherein at least one of the first substrate marking set or the second substrate marking set includes at least one straight line, the line or an extension thereof, passing through the coupling plane;
   the first component includes a first component marking set;
   the second component bears a second component marking set;
   the first component marking set and the second component marking set each including at least two straight, optically detectable lines or markings that extend parallel to a longitudinal axis of the first optical waveguide and a longitudinal axis of the second optical waveguide; and
   the mounting device is configured to assemble the first component, the second component, and the substrate in such a way that the first component and the second component, based on the first component marking set and the second component marking set, are aligned optically with the at least one straight line of at least one of the first substrate marking set or the second substrate marking set.

2. The assembly according to claim 1, wherein the first optical waveguide and the second optical waveguide to be coupled in the first component and the second component, after having been mounted onto the substrate, extend a same distance from the substrate surface, and wherein the first optical waveguide and the second optical waveguide are arranged, at a side of the first component and a side of the second component facing the substrate, at the surface of the first component and the second component.

3. The assembly according to claim 1, wherein the first component and the second component are connected to the substrate using flip chip technology.

4. The assembly according to claim 1, wherein at least one of the first substrate marking set or the second substrate marking set include a line that extends parallel to the coupling plane.

5. The assembly according to claim 1, wherein at least one of the at least one straight line of the first marking set or the second marking set are a line or an edge of an optically detectable surface.

6. The assembly according to claim 1, wherein one or more of the at least one straight line of at least one of the first substrate marking set, the second substrate marking set, the first component marking set, or the second component marking set which, or the extensions of which, pass through the coupling plane are oriented at an angle of less than 90 degrees with respect to the coupling plane, and extend parallel to at least one of the longitudinal axis of the first optical waveguide or the longitudinal axis of the second optical waveguide of the first component or the second component in a region of at least one of the first coupling surface or the second coupling surface.

7. A substrate for mounting a first component and a second component, which are each fixedly connected to the substrate by way of a flip chip technology, wherein a coupling side of the first component and a coupling side of the second component are situated opposite one another on a first side and a second side of a shared coupling plane, wherein an optical waveguide of the first component and an optical waveguide of the second component end at, at least one of, the coupling side of the first component or the coupling side of the second component and are oriented to align with one another and are positioned to be optically coupled to one another at an end face of the first optical waveguide and an end face of the second optical waveguide; and,
   wherein the substrate includes a surface facing the first component and the second component, and further includes a first optically detectable substrate marking set and a second optically detectable substrate marking set for positioning the first component and the second component.

8. The assembly of claim 1, wherein at least one of the first substrate marking set or the second substrate marking set includes at least two straight lines that are parallel to and spaced apart from one another, the lines or the straight extensions thereof passing through the coupling plane.

9. A method for mounting an assembly, the method comprising:
   aligning a first component using a line of a first component marking set with a line of a first substrate marking set;
   aligning a second component using a line of a second component marking set with a second substrate marking set;
   wherein the first component and the second component are fixedly connected to a shared planar substrate, wherein the first component includes an optical waveguide and the second component includes an optical waveguide, wherein the first component and the second component are arranged directly next to one another on the substrate and relative to one another so that a coupling side of the first component and a coupling side of the second component are situated opposite one another on a first side and a second side of a shared coupling plane, wherein the optical waveguide of the first component and the optical waveguide of the second component end at, at least one of, the coupling side of the first component or the coupling side of the second component and are oriented to be aligned with one another and positioned to be optically coupled to one another at an end face of the first optical waveguide and an end face of the second optical waveguide.

10. The method of claim 9, wherein the first component includes the first component marking set and the second component includes the second component marking set.

11. The method of claim 10, wherein the first component marking set and the second component marking set includes as least one straight line.

12. The method of claim 10, wherein the first component marking set and the second component marking set includes at least two straight lines that are parallel to and spaced apart from one another, and wherein the at least two straight lines extend parallel to at least one of a longitudinal axis of the first optical waveguide or a longitudinal axis of the second optical waveguide.

13. The method of claim 9, wherein a surface of the substrate facing at least one of the first component or the second component includes an optically detectable substrate marking set.

14. The method of claim 13, wherein the surface of the substrate includes a second optically detectable marking set.

15. The method of claim 9, wherein at least one of the first component or the second component are connected to the substrate using a bump contact.

16. The method of claim 15, wherein at least one of the first component or the second component are placed on non-deformable mechanical stoppers connected to the substrate during an attachment to the substrate.

17. The method of claim 16, wherein the attachment includes at east one of an attachment by soldering or an attachment to a bump contact.

* * * * *